United States Patent [19]

Opsahl

[11] Patent Number: 4,589,613
[45] Date of Patent: May 20, 1986

[54] COUNTERBALANCED HINGE ASSEMBLY
[75] Inventor: Allan W. Opsahl, Renton, Wash.
[73] Assignee: The Boeing Company, Seattle, Wash.
[21] Appl. No.: 598,555
[22] PCT Filed: Feb. 6, 1984
[86] PCT No.: PCT/US84/00179
  § 371 Date: Feb. 6, 1984
  § 102(e) Date: Feb. 6, 1984
[87] PCT Pub. No.: WO85/03486
  PCT Pub. Date: Aug. 15, 1985
[51] Int. Cl.⁴ ............................................. B64C 1/14
[52] U.S. Cl. ................... 244/129.5; 16/313; 16/278; 49/386; 49/237
[58] Field of Search ................. 244/129.5, 118.1; 16/277, 281, 284, 286, 287, 289, 296, 312, 313; 49/236–245, 37, 386, 248–249

[56] References Cited
U.S. PATENT DOCUMENTS

2,743,476  5/1956  Turner ................................ 16/289
2,752,627  7/1956  Carlson ............................... 16/55
4,447,026  5/1984  Maraghe ......................... 244/129.5

Primary Examiner—Galen L. Barefoot
Attorney, Agent, or Firm—Hughes & Cassidy

[57] ABSTRACT

A counterbalancing system (30) for an inwardly/outwardly moving door (20) pivotable about an inclined hinge axis between fully closed and fully opened positions wherein the door (20) moves: (i) upslope through angle β and downslope through angle θ as it opens; and (ii), upslope through angle θ and downslope through angle β as it closes. The door (20) is hinged to a torque tube assembly (25) coincident with the hinge axis; a radial cam (38) having a profiled cam face (36) is mounted on the torque tube assembly (25) for rotation through the angles β and θ; and, springs (31, 32) are mounted within a housing (34) having a reciprocable piston (44) and a cam follower (35) carried thereby for biasing the follower (35) into engagement with the cam face (36). As door (20) moves downwardly through angles β and θ, the springs (31, 32) are compressed and energy is stored therein. As door (20) is manually shifted upslope through angles β and θ, the springs (31, 32) expand and the energy stored therein is released to impart a counterbalancing rotational torque to the torque tube assembly (25) to minimize the amount of manually applied torque required to move the door (20) along an upslope path.

25 Claims, 9 Drawing Figures

COUNTERBALANCED HINGE ASSEMBLY

RELATED APPLICATIONS

Alex Maraghe and Allan William Opsahl, U.S. Application Ser. No. 448,720, filed Dec. 10, 1982, for "Spring Operated Counterbalance Hinge Assembly For Aircraft Doors", now U.S. Pat. No. 4,479,623.

Karl G. Skotte, U.S. Application Ser. No. 451,809, filed Dec. 21, 1982, for "Cantilever Spring Counterbalance Hinge Assembly For Aircraft Doors", now U.S. Pat. No. 4,474,348.

Alex Maraghe, U.S. Application Ser. No. 474,651, filed Dec. 21, 1982, for "Cam Operated Counterbalance Assembly for Aircraft Doors", now U.S. Pat. No. 4,447,026, a United States National application based on, and designated in, PCT Application No. PCT/US 82/01782 filed Dec. 21, 1982.

BACKGROUND OF THE INVENTION

1. Technical Field

The present invention relates generally to plug-type aircraft doors of the type adapted to swing through an arc approximating 180° about a generally vertical axis between a fully closed position flush with the aircraft fuselage and a fully opened position wherein the door is disposed in a plane essentially parallel to the aircraft fuselage centerline and with the door's outer skin surface in face-to-face relation with the outer skin surface of the fuselage; and, more particularly, to a simple, effective, compact and improved counterbalanced hinge assembly for assisting on-board flight attendants who are required to manually open and close such doors—doors which today often weigh in excess of 300 pounds—and who, in the performance of their duties, must lift the relatively heavy door upwardly while simultaneously pushing outwardly to open the door and, similarly, must again lift the door upwardly while simultaneously pulling the door towards a closed position. Such movement of the door, which presents difficult and awkward problems for on-board flight attendants, is necessitated because the hinge axis for such doors must be inwardly canted from true vertical so that the operating components of the hinge assembly can be mounted within the curved configuration of the fuselage body structure.

2. Background Art

Conventional commercial aircraft are commonly provided with a multiplicity of ingress and egress openings in the aircraft fuselage with suitable doors being provided for closure of such openings. The doors vary widely in terms of their construction and operation. Commonly, such doors are plug-type doors which are designed to fit into the ingress/egress openings when the doors are closed so as to form a substantially smooth, continuous, uninterrupted, exterior skin surface. When such doors are opened, those that comprise outwardly opening doors are commonly pivoted about the axis of a first torque tube assembly mounted in the door and moved slightly inboard, at which point the doors are pivoted simultaneously about the axes of both the first door-mounted torque tube assembly and a second torque tube assembly mounted in the fuselage body structure and to which the door is hingedly connected, with the door moving outwardly through the ingress/egress opening and swinging through an arc approximating 180° so that when fully opened, the door is entirely disposed outside of the aircraft fuselage, lying in a plane generally parallel to the aircraft centerline and with the door's outer skin surface essentially in face-to-face contact with the outer skin surface of the fuselage. In most instances today, such doors are manually operated by on-board flight attendants since most commercial aircraft carriers are reluctant to rely upon electrical actuating systems which are subject to electrical malfunction.

Moreover, as is well known to those skilled in the art, plug-type doors of the foregoing type, since they are required to conform in construction to the shape of the fuselage while providing access to the passenger compartment in the upper lobe of the aircraft, do not, and cannot, lie in a vertical plane either when fully closed or when fully opened; but, rather, they lie in a curvilinear plane having an inwardly canted chord line. As a consequence, the hinge assembly, including the fuselage or body-mounted torque tube assembly which must be entirely confined within the aircraft body structure, is inwardly canted from true vertical, often defining acute angles with the vertical of up to on the order of from 7° to 10°, or slightly more. This, of course, means that when the door is opened and pivoted through an arc about the generally vertical, inwardly canted hinge axis, the door must be initially pushed outwardly while it simultaneously moves upwardly; and, once it has moved through approximately two thirds of its permissible pivotal movement, the door begins to move downwardly toward the outer skin surface of the aircraft fuselage. Conversely, when the door is closed, it must be pulled upwardly and away from the aircraft fuselage; and, when it has transitted approximately one-third of its pivotal movement about the inwardly canted hinge axis, the door begins to move downwardly towards, and into, the ingress/egress opening in the fuselage, thus closing the same. As commercial aircraft get larger and larger, such doors similarly become larger; and, consequently, the doors, together with door mounted actuating systems and the requisite emergency evacuation equipment carried thereby, have become considerably heavier, ofen weighing on the order of 300 pounds or more.

Thus, when an on-board flight attendant attempts to open the door manually, he or she is, in effect, required to push the relatively heavy door uphill during the intial portion of door-opening movement until such time that the door reaches the highpoint in its path of travel, at which point the weight of the door tends to swing it more rapidly downhill towards the fully open position. Even more difficult for the on-board flight attendant is the problem of closing the door which now must be pulled upwardly and away from the fuselage by the attendant, who is standing inside the aircraft, until the door again reaches its highpoint during pivotal movement about the inwardly canted hinge axis, at which piont the weight of the door serves to cause it to move rapidly in a downward and inward direction towards the ingress/egress opening.

The foregoing problem tends to be particularly applicable to aircraft where the door's hinge axis must lie within, and conform to, the chord of the curved fuselage body structure and, consequently, the hinge axis must define an acute angle with the vertical. Cabinet doors, housing doors, and similar type doors, on the other hand, do not normally face this type of problem because such doors are generally hinged about a truly vertical axis, thereby permitting movement of the door through the entire range of movement without having to lift the weight of the door in an upward direction during any portion of door opening or closure. Nevertheless, such doors have commonly included spring-type assist mechanisms, which have generally been provided to insure that the door is biased to at least one of a fully closed and/or a fully opened position. For example, Jordan, U.S. Pat. No. 1,028,571 and Bales et al, U.S. Pat. No. 1,831,800 each disclose arrangements wherein a door (a vehicle door in Jordan and a cabinet door in Bales et al) will generally be in a neutral unbiased position when it is halfway opened, but which moves in either direction from that neutral half opened position as a consequence of the provision of spring mechanisms which serve to bias the door from the neutral position towards both a fully opened and a fully closed position.

In Van Dillen, U.S. Pat. No. 2,208,424, a swinging door closing device is illustrated which employs a casing mounted mechanism biased by a pair of oppositely wound clock springs such that swinging movement of the door in one direction or the other tends to wind a respective one of the two clock springs to establish a restoring moment tending to bias the door twoards the closed position. Somewhat similar disclosures are found in, for example: Henry, U.S. Pat. No. 1,056,171; Bommer, U.S. Pat. No. 1,653,448; Blackwell, U.S. Pat. No. 1,655,043; Moore, U.S. Pat. No. 2,035,823; and, Carlson, U.S. Pat. No. 2,700,175.

Lundine, U.S. Pat. No. 2,557,749, discloses a cantilever-type spring which is mounted on a cabinet structure and which has its free end in engagement with the door. The arrangement is such that when the door is pivoted from a closed position, the spring is deflected to create a restoring moment for automatically closing the door; but, when the door is fully opened, the spring includes a detent-like arrangement for capturing the door edge and holding the door in its fully opened position.

Other patents of general interest illustrating spring-type biasing arrangements for non-aircraft doors are those found in, for example: Schonitzer, U.S. Pat. No. 2,219,824; Chamberlain, U.S. Pat. No. 2,587,287; James et al, U.S. Pat. No. 2,641,795; Wheeler et al, U.S. Pat. Nos. 3,115,685 and 3,124,848; MacDonald, U.S. Pat. No. 3,205,532; Shaw et al, U.S. Pat. No. 3,358,320; Ventura, U.S. Pat. No. 3,401,422; Larson, U.S. Pat. No. 3,496,595; Floehr, U.S. Pat. No. 3,712,248; Little, U.S. Pat. Nos. 3,714,680 and 3,766,600; Murphy et al, U.S. Pat. No. 3,918,755; and, Gronbach et al, U.S. Pat. No. 4,236,272. The two Wheeler et al patents, as well as the Ventura and Murphy et al patents, illustrate combined spring-like camming arrangements and cam follower rollers for attaining the desired biasing motion to move a door towards a fully closed and/or a fully opened position.

Insofar as aircraft are concerned, counterbalance systems have also been known; but, they tend to vary widely dependent upon the type of door involved. For example, in a plug-type door of the type adapted to move inwardly and upwardly along tracks disposed on the interior of the aircraft, it is common to provide a counterbalance system including cables and pulleys for minimizing the amount of exertion required to raise the heavy door upwardly along its tracks. Similarly, in Moses, U.S. Pat. No. 4,086,726, a counterbalance system is provided for an aircraft door which is intended to swing about a horizontal axis in an outward and downward direction for providing a ramp or steps permitting access to the aircraft. Other patents pertaining to aircraft doors which are of general interest, but which do not disclose counterbalancing systems of the type here under consideration, include, for example: McAfee et al, U.S. Pat. No. 2,763,900; Bergman et al, U.S. Pat. No. 3,051,280; Baker, U.S. Pat. No. 3,791,073; and, Hawker Siddeley, U.K. Pat. No. 1,551,821; while U.S. Pat. No. 2,734,740—Morris is of interest for its disclosure of a multi-positionable spring biased cockpit canopy.

In recent years, large commercial aircraft of the type employing outwardly opening plug-type doors have faced problems similar to the problem faced and resolved by the present invention. In those types of door counterbalancing systems, the particular aircraft body structure has provided sufficient room to accommodate a plurality of coil springs—generally three such springs—coaxially and in generally end-to-end relation about the torque tube carried within the fuselage body structure. One of such coil springs has generally been wound in a direction to permit biasing of the door in one direction during the initial portion of either door opening or closing movement, while the remaining two springs have served to provide the biasing forces required during the initial portion of movement in the opposite direction. However, with present day aircraft where the doors are characterized by their large size and weight and wherein the aircraft's aerodynamic contour is such that the hinge axis defines a significant acute angle, the weight of the doors has required the use of increased bearing supports, and supplemental snubber mechanisms and the like, which provide retarding forces when the door is moving in either direction along a downward path so as to protect the door, the fuselage and the actuating mechanisms from damage due to sudden jars or shocks. Because of such supports and/or mechanisms, and the constrained nature of the space within the fuselage body structure, it has been found that there simply is not sufficient space to permit usage of coil springs in surrounding relationship to the body-mounted torque tube.

It was within the framework of the foregoing prior art approaches that the counterbalancing systems disclosed and claimed in the aforesaid copending applications of: (i) Maraghe and Opsahl; (ii) Skotte; and, (iii), Maraghe—now U.S. Pat. Nos. 4,479,623, 4,474,348 and 4,447,026, respectively—were developed. While such systems have proven effective for their intended purposes and have provided significant improvements over known prior approaches, they have, nevertheless, failed to provide a smooth non-linear door counterbalancing moment of optimum efficiency; and, continuing problems with relatively short fatique lives for the counterbalancing components have been experienced.

SUMMARY OF THE INVENTION

A compact, composite cam/spring operated, two-way counterbalance system is provided for the hinge assembly of an inwardly/outwardly moveable aircraft passenger door of the type adapted to pivot about an inwardly canted hinge axis wherein a spring biased cam follower mechanism is mounted within the aircraft's fuselage for coaction with a radially extending cam formed on, and rotatable with, the body-mounted torque tube assembly for providing a smooth non-linear counterbalancing force for assisting on-board flight attendants in: (i) opening the door during that portion of door movement when it must move in an outward and upward direction; and (ii), closing the door during that portion of door movement when the on-board flight attendant is required to pull the door upwardly and away from the fuselage towards the ingress/egress opening in the fuselage. In the exemplary form of the invention here described, this is achieved by providing a pair of compact, coaxial, concentric, coil spring members for biasing a cam follower into engagement with a laterally or radially projecting cam carried on, and rotatable with, the body-mounted torque tube assembly; and, wherein the cam profile is selected so as to optimize the non-linear counterbalancing moment established by the composite cam/spring arrangement and to establish a smooth, minimal resultant torque that must be manually generated by the on-board flight attendant during both a door opening and a door closing operation. The compact nature of the composite cam/spring biasing arrangement of the present invention readily permits the incorporation of more extensive bearing support surfaces for the torque tube and the necessary snubber mechanisms and the like which serve to brake or retard movement of the relatively heavy door during the downward portions of movement when the door is being closed or opened; while, at the same time, the counterbalancing components employed function during both door opening and door closure, thus reducing stress levels and increasing the fatigue life of the system. Moreover, counterbalancing reaction loads imposed on the aircraft's body structure are minimized, further reducing the danger of fatigue damage.

Accordingly, it is a general aim of the present invention to provide a simple, compact, lightweight, yet highly effective, composite cam/spring operated counterbalance mechanism which is capable of minimizing the exertion required by on-board flight attendants in opening and closing plug-type doors on aircraft, yet which does not occupy a significant amount of space within the aircraft body structure and which readily permits the incorporation of necessary auxiliary equipment of the type commonly associated with the hinge mechanisms for such doors.

In another of its important aspects, it is an object of the invention to provide a simple, highly effective door counterbalancing assembly which readily permits of bench assembly prior to installation, thereby facilitating both installation and maintenance of the system.

DESCRIPTION OF THE DRAWINGS

These and other objects and advantages of the present invention will become more readily apparent upon reading the following detailed description and upon reference to the attached drawings, in which:

FIG. 8 is a fragmentary perspective view illustrating details of the body-mounted torque tube assembly and counterbalance mechanism of the present invention; and, FIG. 9 is a graphic representation of the forces required to open and close aircraft passenger doors manufactured in accordance with the present invention, here illustrating the angular position of the door in degrees (0° being representative of a fully closed door and approximately 173° being representative of a fully opened door) along the abscissa, and hinge moment—i.e., the requisite force to move the door—in inch/pounds along the ordinate; and, illustrating also, the improvement attained when employing the present invention—an improvement most evident upon comparison of the curve representative of the manually applied torque required of the on-board flight attendant to open and/or close the door when practicing the invention with the comparable manual torque inputs required in connection with the counterbalance systems disclosed and claimed in the aforesaid copending applications of: (i) Maraghe and Opsahl; (ii) Skotte; and (iii), Maraghe—now U.S. Pat. Nos. 4,479,623, 4,474,348 and 4,447,026, respectively.

While the invention is susceptible of various modifications and alternative forms, a specific embodiment thereof has been shown by way of example in the drawings and will herein be described in detail. In should be understood, however, that it is not intended to limit the invention to the particular form disclosed but, on the contrary, the intention is to cover all modifications, equivalents and alternatives falling within the spirit and scope of the invention as expressed in the appended claims.

DETAILED DESCRIPTION

Environment Of The Invention

Figure 1:
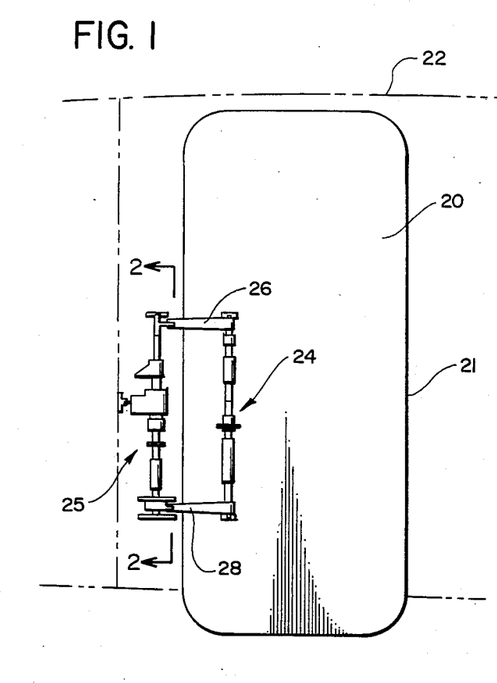
FIG. 1 is an external, highly diagrammatic, fragmentary side elevational view of a portion of a conventional large capacity passenger aircraft fuselage, shown in phantom lines, and depicting in solid lines the location of a conventional passenger plug-type ingress/egress door of the type adapted to move inwardly and outwardly during door closing and opening movements, respectively; and, also depicting in solid line diagrammatic form the relative locations of the fuselage, or body-mounted, and the door-mounted torque tube assemblies which form part of a conventional door hinge assembly.
Figure 2:
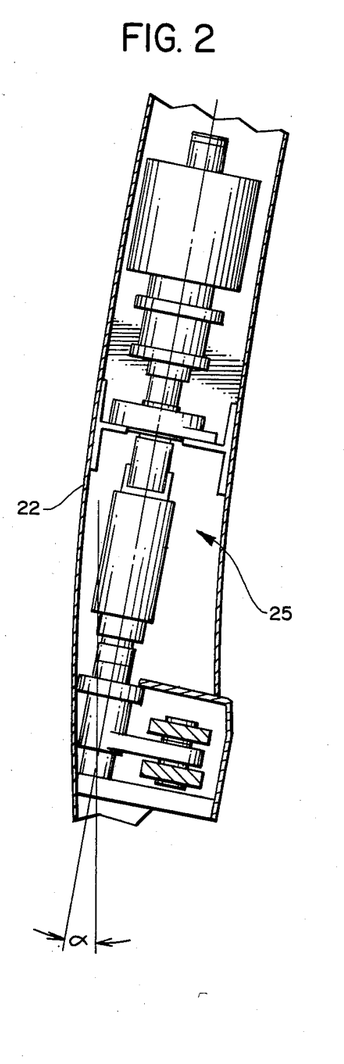
FIG. 2 is a diagrammatic sectional view taken substantially along the line 2—2 in FIG. 1 here illustrating the contour of the aircraft fuselage at the passenger ingress/egress door location wherein such contour mandates that the torque tube/hinge assembly be canted inwardly—i.e., that it be oriented at an acute angle to the vertical—thus necessitating upward movement of the door about the inclined hinge axis during the initial portion of both door opening movement and door closing movment.

Turning first to FIGS. 1 and 2, conjointly, there has been illustrated, in simplified diagrammatic form, a typical aircraft plug-type door 20 of the type adapted to be swung inwardly and outwardly of the aircraft about a generally vertical axis for closing and opening an ingress/egress opening 21 formed in the fuselage 22 of the aircraft. As here illustrated, the exemplary construction includes a first door-mounted torque tube assembly, generally indicated at 24 in FIG. 1, and a second torque tube assembly, generally indicated at 25 in FIGS. 1 and 2, mounted in stationary bearings integrally secured to the fuselage 22 body structure, with the two torque tube assemblies being interconnected by upper and lower hinge arms 26, 28, respectively. As is evident upon inspection of FIG. 2, the curved nature of the aircraft fuselage 22 in the region of the ingress/egress opening 21 (FIG. 1) disposed in the upper lobe passenger compartment is such that both torque tube assemblies but, especially the body-mounted torque tube assembly 25, must be inwardly canted, defining an acute angle $\alpha$ with the vertical.

Figure 3:
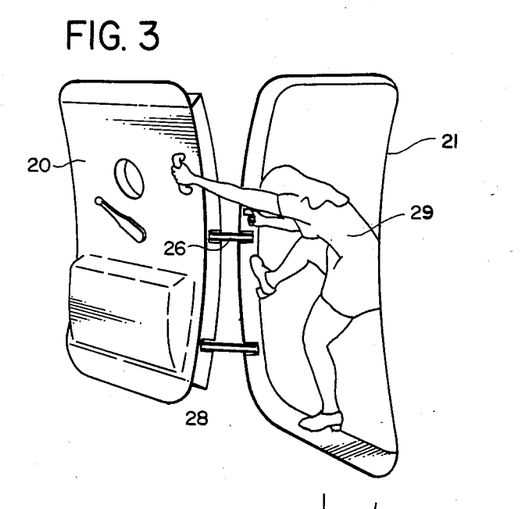
FIG. 3 is a fragmentary perspective view here depicting an on-board aircraft attendant attempting to initiate closing movement of a fully opened aircraft passenger door.

Moreover, as will be apparent to those skilled in the art, the exemplary plug-type door 20 of the type here shown is conventionally designed to be opened by unlocking the door and rotating the door about the axis of the door-mounted torque tube assembly 24, so as to move the door inwardly into the passenger compartment from a fully closed and sealed position, at which point the door is rotated simultaneously about the axes of both the door-mounted torque tube assembly 24 and the body-mounted torque tube assembly 25 with the door moving outwardly through the ingress/egress opening 21 and swinging in an arc approximating 180°—here, the arc is actually about 173°—about the hinge axis. Because the hinge axis is inwardly canted defining an acute angle $\alpha$ which is on the order of approximately 10°, as the door rotates it must move along an uphill slope during at least a portion of both its opening travel and its closing travel. In practice, during opening of the door, it tends to move in an upward and outward direction during the initial portion of motion through an arc approximating 123°; and, thereafter, it moves along a downward slope about the inwardly canted hinge axis through an arc of about 50° until it lies in the fully open position shown in FIG. 3. Thus, during closing movement, the on-board flight attendant 29 is required to grasp the door 20, which will generally weigh on the order of 300 pounds or more, and move it simultaneously outwardly away from the fuselage and upwardly along an inclined slope through an arc approximating 50°, at which point the door begins to move towards the ingress/egress opening 21 along a downward slope. Unfortunately, the on-board location of the flight attendant makes such door movement extremely difficult because of the exceedingly poor leverage that he or she is able to apply.

Figure 4:
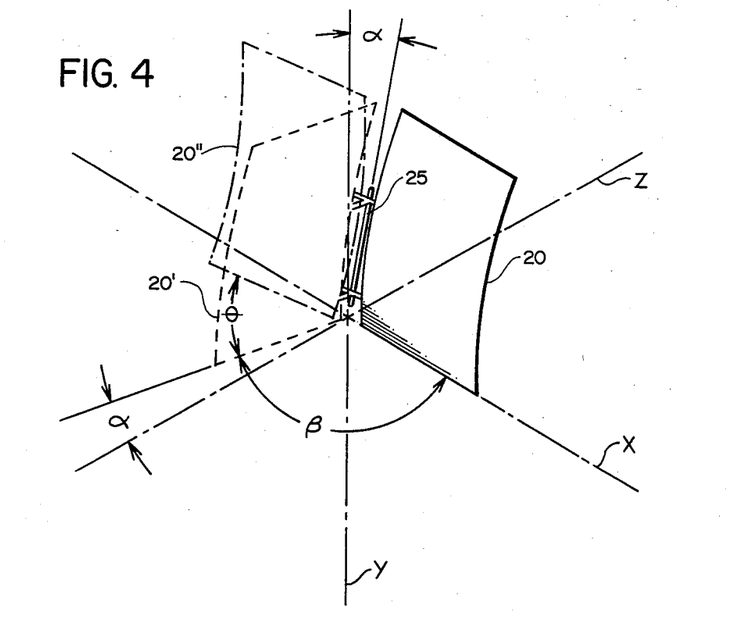
FIG. 4 is a diagrammatic perspective line drawing illustrative of the movement of a structural element—for example, an aircraft passenger door—about a simple canted or non-vertical hinge axis, and in XYZ coordinate space, between fully closed, partially closed or opened, and fully opened positions, respectively illustrated in solid lines, broken lines and dash-dot lines.

The foregoing problem may be more easily understood by reference to the diagrammatic line drawing set forth in FIG. 4 wherein a structural member, such as an aircraft door 20, has been illustrated in solid lines in the fully closed position, in broken lines in the partially open position shown at 20', and in dash-dot lines in the fully open position shown at 20", with the door being adapted for movement in XYZ coordinate space about the axis of a simple torque tube assembly 25 disposed at an acute angle $\alpha$ on the order of 10° with the vertical axis Y. Thus, when the door is moved from the closed position indicated at 20 to the partially open position indicated at 20', it must be moved through the angle of rotation $\beta$; and, during that portion of door movement about the inwardly canted axis of the torque tube assembly 25, the door moves uphill so that its bottom edge defines an acute angle $\alpha$ with the XZ plane. Continued opening movement of the door from the position 20' to the fully opened position 20" requires movement of the door through an angle of rotation $\theta$ until such time as it is fully opened, at which point its bottom edge is again generally parallel to the XZ plane. Conversely, when the door is moved from the fully open position indicated at 20" to the fully closed position indicated at 20, it first moves in an uphill direction through the angle of rotation $\theta$; and, thereafter, the door moves downwardly through the angle of rotation $\beta$ until fully closed. During downward movment of the door through the angle $\beta$ in closing and the angle $\theta$ in opening, the weight of the door tends to aid in door movement; but, during upward movement of the door through the angle $\beta$ when the door is opening and through the angle $\theta$ when the door is closing, the weight of the door functions to resist the forces applied by the attendant to move the door. Accordingly, the present invention is concerned with a counterbalance mechanism that tends to minimize or counterbalance the resistance forces created by the weight of the door as the on-board flight attendant moves the door through its upward paths of movement in both a door opening and a door closing mode of operation.

Counterbalance Mechanism Embodying the Present Invention

In accordance with the important aspects of the present invention, and as best illustrated by reference to FIGS. 5 through 8 conjointly, a simple, highly effective, compact, composite cam/spring operated counterbalance mechanism, generally indicated at 30 in the drawings, is provided for establishing a negative hinge moment which counteracts the positive hinge moment attributable to the weight of the door 20 during movement of the door along upward slopes as the door rotates about the inwardly canted hinge axis during both door opening and door closing movement. To this end, there have been provided a pair of concentric, coaxial, coil spring members 31, 32 mounted within a cylindrical housing 34 for biasing a cam follower or roller 35 into engagement with the profiled face 36 of a radially or laterally projecting cam 38 carried by, and rotatable with, the body-mounted torque tube assembly 25. The torque tube assembly 25 further includes a conventional snubber mechanism 39 which functions in a manner well known to those skilled in the art to retard and brake the door as it moves through its downwardly sloped paths of movement during both door opening and door closing movement.

Figure 5:
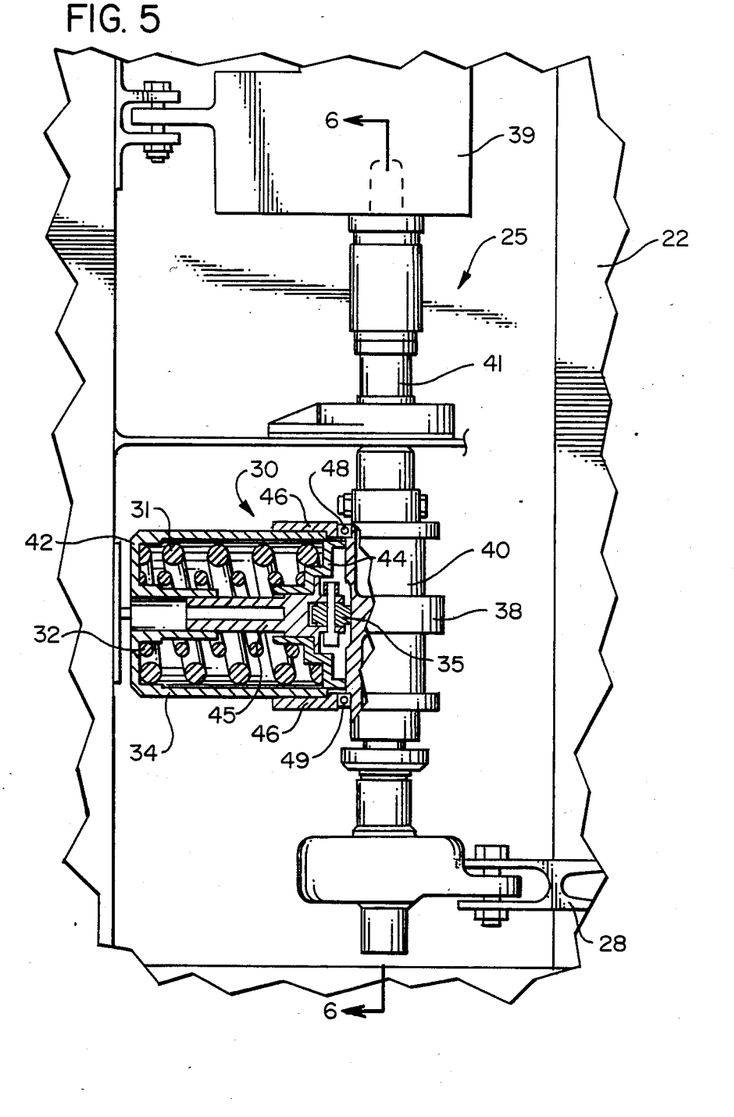
FIG. 5 is a fragmentary side elevational view, partially in section and with parts removed for purposes of clarity, here illustrating a portion of the aircraft passenger door hinge assembly including particularly the fuselage or body-mounted torque tube assembly and a counterbalance mechanism embodying features of the present invention for minimizing the amount of manual exertion required to open a fully closed door and to close a fully opened door.
Figures 6, 7:
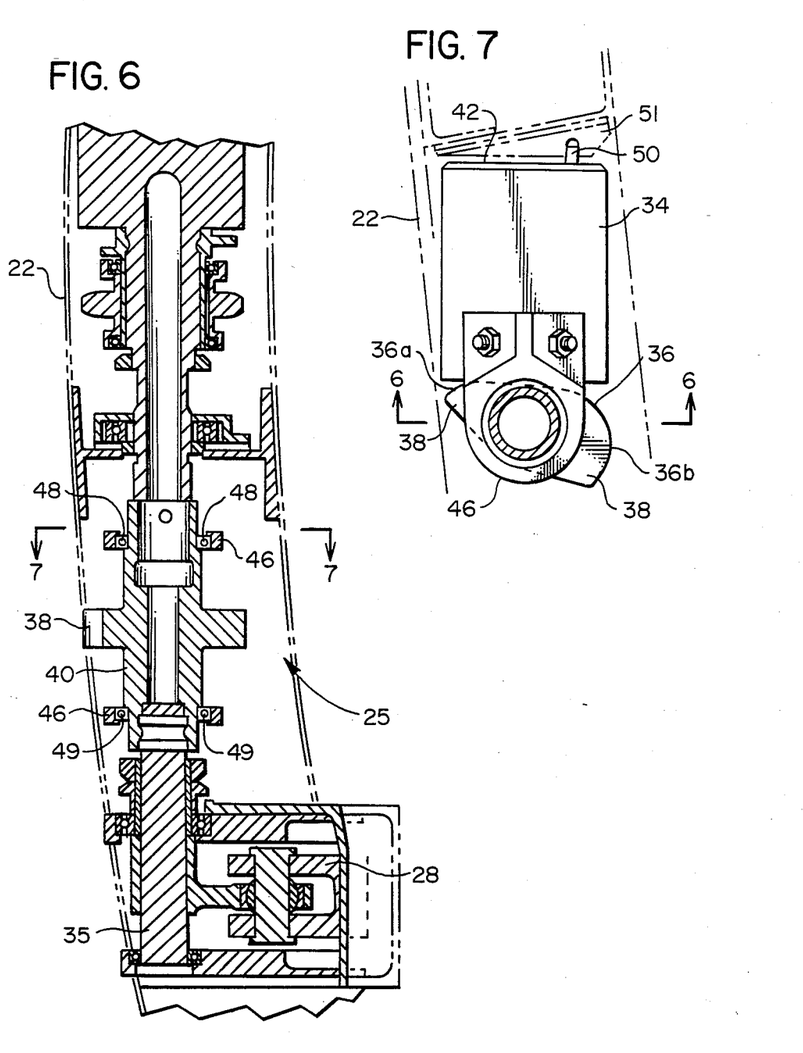
FIG. 6 is a sectional view taken substantially along the line 6—6 in FIG. 5, here illustrating details of the body-mounted torque tube assembly and the splined shaft and cam arrangement of the present invention.
FIG. 7 is a sectional view taken substantially along the line 7—7 in FIG. 6, here illustrating mounting details of the exemplary counterbalance mechanism of the present invention.
Figure 8:
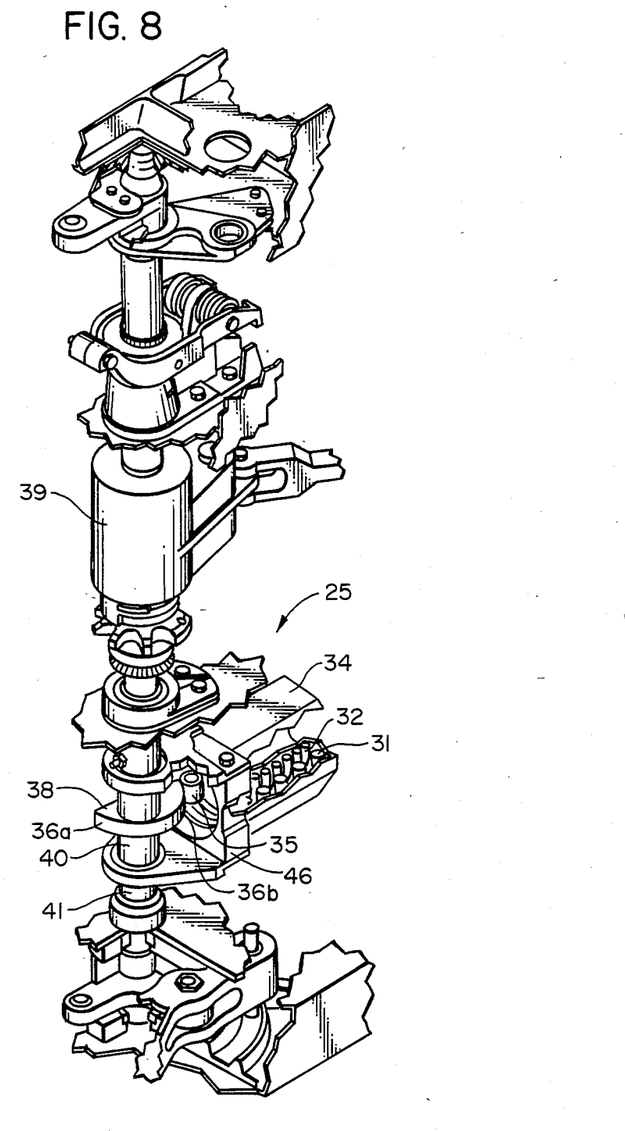

In carrying out the present invention, the body-mounted torque tube assembly 25 includes an internally splined cylindrical sleeve or shaft 40 which is nonrotatably secured to the torque tube 41 associated with the torque tube assembly 25; with the shaft 40 including as an integral part thereof the radially or laterally extending cam 38 (as best illustrated in FIGS. 7 and 8). The coaxial concentric coil spring members 31, 32 mounted within cylindrical housing 34 each have one end (here, the left ends as viewed in FIG. 5) bottomed on the interior surface of an end wall 42 on housing 34; and, their opposite ends (here, the right ends as viewed in FIG. 5) bottomed on an annular stepped piston 44 slidably mounted within housing 34 on a yoke 45, the outboard end of which rotatably supports the cam follower or roller 35 and maintains the latter in alignment and face-to-face contact with the profiled face 36 on cam 38. A suitable bearing housing assembly 46 is mounted on the cylindrical housing 34 and is provided with upper and lower bearing races 48, 49, respectively, which serve to rotatably journal the internally splined shaft 40 on the body-mounted torque tube assembly 25 with respect to housing 34. In the exemplary form of the invention here depicted, the end wall 42 of housing 34 is provided with a lug 50 which is received in, and engaged with, a stationary fitting 51 on the body structure of the aircraft, as best shown in FIG. 7.

Thus, the arrangement is such that when the aircraft door 20 is located at the uppermost point in its path of movement as indicated at 20' in FIG. 4, the cam 38 mounted on the body-mounted torque tube assembly 25 is in the position shown in FIG. 7, with that portion of the profiled cam face 36 having the smallest radius being engaged with the cam follower or roller 35 (FIG. 5). As a consequence, the coaxial concentric spring members 31, 32 are in their fully extended or expanded position as shown in FIG. 5. Assuming that the on-board flight attendant is opening the door 20—i.e., shifting the door from the partially opened position indicated at 20' in FIG. 4 to the fully opened position indicated at 20", as the door moves through the angle $\theta$, it is moving downslope; and, the body-mounted torque tube assembly 25 and the cam 38 carried thereby are rotating in a clockwise direction as viewed in FIG. 7. As a consequence, the cam follower or roller 35 traverses that portion of the profiled cam face 36 indicated at 36a in FIG. 7, serving to compress the coaxial concentric coil spring members 31, 32 and shifting them to the left as viewed in FIG. 5 so as to store energy therein.

When the on-board flight attendant 29 desires to close the door 20, as he or she pulls the door in an upslope direction through the angle $\theta$ from the position 20" towards the position 20' shown in FIG. 4, the energy stored in the thus compressed spring members 31, 32 imparts rotational torque to the torque tube 41 through the cam follower/cam combination 35/38, thus serving to assist the attendant in moving the door along the upslope path and minimizing the amount of manually generated torque required. Once the door 20 has reached the highpoint in its path of travel as indicated at 20' in FIG. 4, the body-mounted torque tube assembly 25 and cam 38 are again in the position shown in FIG. 7; and, as the door 20 moves along a downslope path through the angle $\beta$ shown in FIG. 4, the body-mounted torque tube assembly 25 and cam 38 are rotated in a counterclockwise direction as viewed in FIG. 7 with the cam follower or roller 35 traversing that portion of the profiled cam face 36 indicated at 36b in FIG. 7, thereby again compressing the spring members 31, 32 and storing energy therein. As a consequence, when the on-board flight attendant 29 wishes to open the fully closed door 20, as he or she pushes the door 20 outwardly and upwardly through the angle $\beta$, the energy stored within the spring members 31, 32 again serves to impart rotational torque to the torque tube 41 to assist the attendant and minimize the amount of manually applied torque required.

Figure 9:
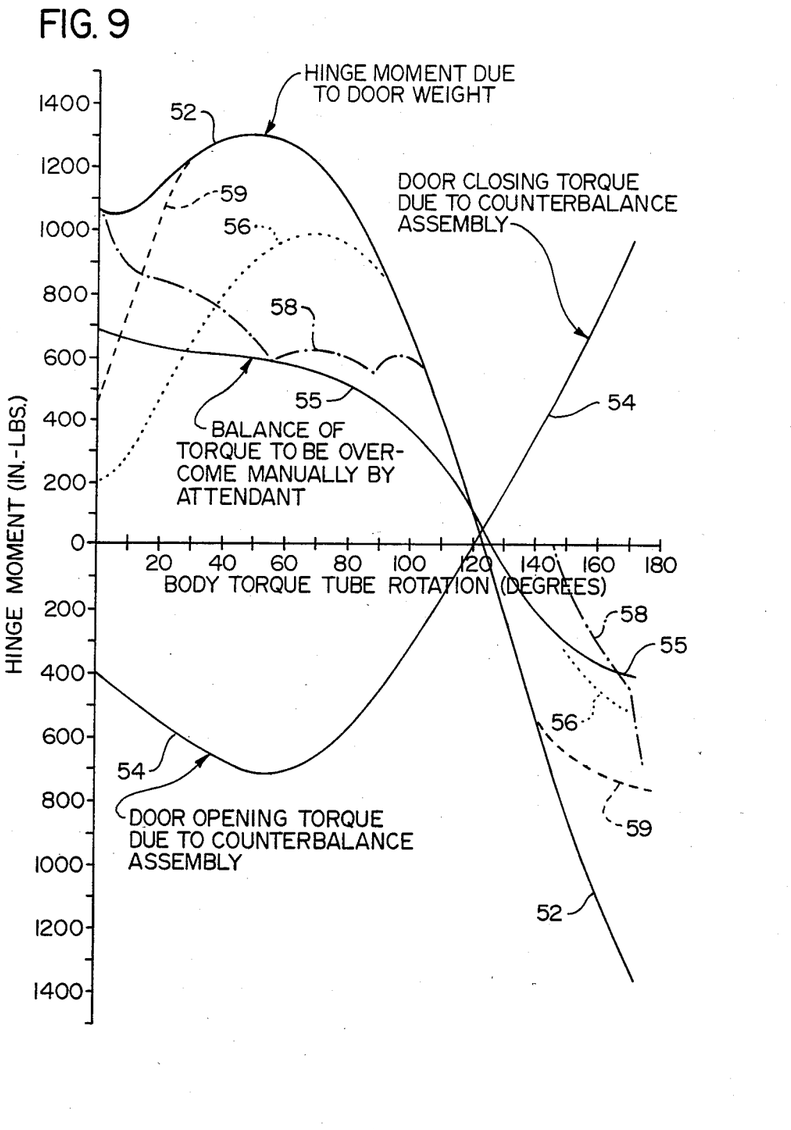

Referring next to FIG. 9, certain of the advantages attained by the present invention will become more readily understandable. Thus, as here shown, it will be noted that the hinge moment attributable to the weight of the door 20 is represented by the solid line curve 52. Considering the force required to overcome hinge moment during door opening movement, it will be noted that approximately 1,070 in./lbs. are required at the outset to initiate movement of the door 20 from a fully closed position; and, as the door progressively moves through angle $\beta$ (FIG. 4), the amount of force required gradually increases throughout the first 45° to 50° of door movement to a maximum of slightly more than 1300 in./lbs.; and, thereafter, the requisite force progressively decreases, reaching 0 in./lbs. when the door 20 reaches its highpoint—i.e., a point 20' where the angle $\beta$ (FIG. 4) is approximately 123°—at which point the door commences downward movement and the weight of the door itself provides the force necessary to fully open the door. At the same time, however, and as more clearly evident upon inspection of the solid line curve 54 in FIG. 9, the counterbalancing system 30 of the present invention, here comprising concentric coaxial coil spring members 31, 32 acting in conjunction with the cam follower or roller 35 and cam 38, provides a non-linear decreasing negative torque ranging from about 400 in./lbs. when the door 20 is fully closed to slightly more than 700 in./lbs. when the door has moved through approximately 50° of rotational movement—i.e., through slightly less than one-half of the angle $\beta$ (FIG. 4)—and, thereafter, the counterbalancing system 30 provides a non-linear decreasing negative torque which reaches approximately 0 in./lbs. as the door 20 approaches the highpoint in its path of movement as indicated by the position shown at 20' in FIG. 4. As the door continues through the angle $\theta$ from the position 20' towards the position shown at 20" in FIG. 4, the spring members 31, 32 are again compressed as described above; thus storing energy therein sufficient to provide an increasing non-linear positive torque ranging up to approximately 1,000 in./lbs. when the door reaches its fully open position indicated at 20" in FIG. 4. The net result is that the on-board flight attendant 29 is required to manually impart a gradually decreasing torque represented by the solid line curve 55 in FIG. 9, such torque ranging from approximately 670 in./lbs. when the door 20 is fully closed to only a few in./lbs. as the door 20 passes its highpoint 20' as shown in FIG. 4 during a door opening movement. Similarly, during a door closing movement, the on-board flight attendant is required to manually apply a torque ranging from approximately 400 in./lbs. to only a few in./lbs. as the door is moved through its upslope path through angle $\theta$; and, thereafter, the weight of the door 20 serves to move the door through the balance of its downslope path through angle $\beta$ towards a fully closed position.

The advantages attainable with the present invention may be readily ascertained by comparison of the solid line curve 55 representative of the manually applied torque required by the attendant 29 when closing and-/or opening a counterbalanced door 20 embodying the features of the present invention with, for example, any one of the dotted line curves 56, the dash-dot curves 58, or the dashed curves 59 which respectively correspond to the resultant torque that must be manually applied by the on-board flight attendant when the aircraft door incorporates the counterbalancing systems respectively disclosed in the aforesaid copending applications of: (i) Maraghe and Opsahl; (ii) Maraghe; and (iii), Skotte—now U.S. Pat. Nos. 4,479,623, 4,474,348 and 4,447,026.

Thus, those skilled in the art will appreciate that there has herein been described a simple, extremely compact, and exceedingly effective composite cam/spring counterbalance system 30 which minimizes the rotational torque that must be physically imparted to the door 20 by the on-board flight attendant 29 during those portions of door opening and/or closing movement when the door is moving along an upslope path; and, wherein the counterbalancing forces imparted by the system 30 can readily comprise predesigned, preprogrammed and tailored non-linear forces suitable for counteracting the non-linear hinge moment attributable to the door's weight by the simple expedient of proper selection of the spring member or members 31, 32 employed and by suitable profiling of the cam face 36 on cam 38. Moreover, since all counterbalancing components function in an essentially uniform manner during both door closing and door opening operations, the fatique lives thereof are significantly extended. The only components that need be physically mounted on the torque tube assembly 25 are the composite cam/sleeve 38/40, thereby optimizing the available space needed for snubber mechanisms 39 and bearing supports. At the same time, the sub-assembly defined by the housing 34, piston 44, springs 31, 32, yoke 45 and cam follower 35 can be easily bench-fabricated, thereby simplifying installation and servicing of the system.

What is claimed is:

1. In combination with a door of the type adapted to be shifted outwardly and inwardly to open and close an ingress/egress opening in a structural member during door opening and closing operations, respectively, about a generally vertical but inwardly canted hinge axis defined by a torque tube mounted in said structural member with freedom for rotation about said axis and drivingly coupled to said door by hinge link defining means, and wherein said door is required to move in an upslope direction through an angle $\beta$ and thereafter in a downslope direction through an angle $\theta$ during door opening movement and upslope through an angle $\theta$ and thereafter downslope through an angle $\beta$ during door closing movement as a direct result of pivotal door movement about said generally vertical inwardly canted hinge axis, the improvement in a counterbalanced hinge assembly comprising:

(a) radially extending cam means non-rotatably mounted on said torque tube, said cam means defining an arcuate profiled cam face having an included angle at least equal to the sum of the angles $\beta$ and $\theta$ and wherein the radius of said cam means is smallest at the juncture of said angles $\beta$ and $\theta$; and, (b) compressible/expandable energy storage means mounted on said structural member adjacent said cam means on said torque tube, said energy storage means including a first end bottomed on said structural member, a cam follower mounted on the opposite end thereof in engagement with said arcuate profiled cam face, and compressible/expandable means interposed between said first end and said cam follower for continuously biasing said cam follower into engagement with said arcuate profiled cam face;

so that when said door is at the highpoint in its path of movement between fully opened and fully closed positions, said cam follower engages said arcuate profiled cam face at the juncture of said angles $\beta$ and $\theta$ so that: (i) as said door moves in a downslope direction through said angle $\beta$ towards a fully closed position, said torque tube and said cam means rotate through said angle $\beta$ and said cam follower traverses the portion of said arcuate profiled cam face coincident with said angle $\beta$ for compressing said compressible/expandable means and storing energy therein; and (ii), as said door moves in a downslope direction through said angle $\theta$ towards a fully opened position, said torque tube and said cam means rotate through said angle $\theta$ and said cam follower traverses the portion of said arcuate profiled cam face coincident with said angle $\theta$ for compressing said compressible/expandable means and storing energy therein; whereby when said door is manually shifted from either a fully closed position moving upslope through said angle $\beta$ or a fully opened position moving upslope through said angle $\theta$, said compressible/expandable means expands and the energy stored therein imparts a counterbalancing rotational torque to said torque tube through said cam follower/cam face combination for counterbalancing the hinge moment attributable to the weight of said door and minimizing the amount of manually applied torque required to move said door along said upslope paths.

2. The combination as set forth in claim 1 wherein said compressible/expandable means comprises at least one coil spring.

3. The combination as set forth in claim 1 wherein said compressible/expandable energy storage means includes a cylindrical housing closed at one end thereof and a piston slidably mounted in said housing; said compressible/expandable means comprises spring means bottomed at one end on said closed housing end and at the oppsite end on said piston; and, said cam follower is mounted on said piston.

4. The combination as set forth in claim 3 wherein said compressible/expandable spring means comprises coaxial, concentric coil springs.

5. The combination as set forth in claim 3 wherein said piston comprises an annular piston mounted on an axially extending reciprocable yoke member, and said cam follower comprises a roller journaled for rotation in said yoke member.

6. The combination as set forth in claim 4 wherein said piston comprises an annular piston mounted on an axially extending reciprocable yoke member, and said cam follower comprises a roller journaled for rotation in said yoke member.

7. The combination as set forth in claim 1 wherein said door is a plug-type aircraft door.

8. The combination as set forth in claim 1 wherein said inwardly canted hinge axis defines an acute included angle $\alpha$ on the order of about 10° with a vertical plane.

9. The combination as set forth in claim 1 wherein said angle $\beta$ is on the order of about 123° and said angle $\theta$ is on the order of about 50°.

10. The combination as set forth in claim 1 wherein said door weighs on the order of 300 pounds.

11. The combination as set forth in claim 10 wherein the hinge moment attributable to the weight of said door ranges between about 1300 in./lbs. and about 0 in./lbs. as said fully closed door is manually moved upslope through said angle 62 and between about 1400 in./lbs. and about 0 in./lbs. as said door is manually moved upslope through said angle $\theta$; and, wherein said counterbalanced hinge assembly reduces the amount of manually applied torque required: (i) to move said door in an upslope direction through said angle $\beta$ from a maximum of about 700 in./lbs. when said door is fully closed to about 0 in./lbs.; and (ii), to move said door in an upslope direction through said angle $\theta$ from a maximum of about 400 in./lbs. when said door is fully open to about 0 in./lbs.

12. The combination as set forth in claim 1 wherein said counterbalancing rotational torque imparted to said torque tube during upslope movement of said door is non-linear and wherein the required manually generated rotational torque necessary to manually move said door along an upslope path progressively and smoothly decreases non-linearly as said door moves upslope from a fully closed or open position towards its highpoint.

13. The combination as set forth in claim 11 wherein said counterbalancing rotational torque imparted to said torque tube during upslope movement of said door is non-linear and wherein the required manually generated rotational torque necessary to manually move said door along an upslope path progressively and smoothly decreases non-linearly as said door moves upslope from a fully closed or open position towards its highpoint.

14. In combination with an aircraft plug-type door adapted to be shifted outwardly and inwardly to open and close an ingress/egress opening in the aircraft fuselage during door opening and closing operations, respectively, about a generally vertical but inwardly canted hinge axis defined by a torque tube mounted in said fuselage with freedom for rotation about said axis and drivingly coupled to said door by hinge link defining means, and wherein said door is required to move in an upslope direction through an angle $\beta$ and thereafter in a downslope direction through an angle $\theta$ during door opening movement and upslope through an angle $\theta$ and thereafter downslope through an angle $\beta$ during door closing movement as a direct result of pivotal door movement about said generally vertical inwardly canted hinge axis, the improvement in a counterbalanced hinge assembly comprising:
  (a) radially extending cam means non-rotatably mounted on said torque tube, said cam means defining an arcuate profiled cam face having an included angle at least equal to the sum of the angles $\beta$ and $\theta$ and wherein the radius of said cam means is smallest at the juncture of said angles $\beta$ and $\theta$; and,
  (b) compressible/expandable energy storage means mounted on said aircraft fuselage adjacent said cam means on said torque tube, said energy storage means including a first end bottomed on said aircraft fuselage, a cam follower mounted on the opposite end thereof in engagement with said arcuate profiled cam face, and compressible/expandable means interposed between said first end and said cam follower for continuously biasing said cam follower into engagement with said arcuate profiled cam face;

so that when said door is at the highpoint in its path of movement between fully opened and fully closed positions, said cam follower engages said arcuate profiled cam face at the juncture of said angles $\beta$ and $\theta$ so that:
(i) as said door moves in a downslope direction through said angle $\beta$ towards a fully closed position, said torque tube and said cam means rotate through said angle $\beta$ and said cam follower traverses the portion of said arcuate profiled cam face coincident with said angle $\beta$ for compressing said compressible/expandable means and storing energy therein; and (ii), as said door moves in a downslope direction through said angle $\theta$ towards a fully opened position, said torque tube and said cam means rotate through said angle $\theta$ and said cam follower traverses the portion of said arcuate profiled cam face coincident with said angle $\theta$ for compressing said compressible/expandable means and storing energy therein; whereby when said door is manually shifted from either a fully closed position moving upslope through said angle $\beta$ or a fully opened position moving upslope through said angle $\theta$, said compressible/expandable means expands and the energy stored therein imparts a counterbalancing rotational torque to said torque tube through said cam follower/cam face combination for counterbalancing the hinge moment attributable to the weight of said door and minimizing the amount of manually applied torque required to move said door along said upslope paths.

15. The combination as set forth in claim 14 wherein said compressible/expandable means comprises at least one coil spring.

16. The combination as set forth in claim 14 wherein said compressible/expandable energy storage means includes a cylindrical housing closed at one end thereof and a piston slidably mounted in said housing; said compressible/expandable means comprises spring means bottomed at one end on said closed housing end and at the opposite end on said piston; and, said cam follower is mounted on said piston.

17. The combination as set forth in claim 16 wherein said compressible/expandable spring means comprises coaxial, concentric coil springs.

18. The combination as set forth in claim 16 wherein said piston comprises an annular piston mounted on an axially extending reciprocable yoke member, and said cam follower comprises a roller journaled for rotation in said yoke member.

19. The combination as set forth in claim 17 wherein said piston comprises an annular piston mounted on an axially extending reciprocable yoke member, and said cam follower comprises a roller journaled for rotation in said yoke member.

20. The combination as set forth in claim 14 wherein said inwardly canted hinge axis defines an acute included angle $\alpha$ on the order of about 10° with a vertical plane.

21. The combination as set forth in claim 14 wherein said angle $\beta$ is on the order of about 123° and said angle $\theta$ is on the order of about 50°.

22. The combination as set forth in claim 14 wherein said door weighs on the order of 300 pounds.

23. The combination as set forth in claim 22 wherein the hinge moment attributable to the weight of said door ranges between about 1300 in./lbs. and about 0 in./lbs. as said fully closed door is manually moved upslope through said angle $\beta$ and between about 1400 in./lbs. and about 0 in./lbs. as said door is manually moved upslope through said angle $\theta$; and, wherein said counterbalanced hinge assembly reduces the amount of manually applied torque required: (i) to move said door in an upslope direction through said angle $\beta$ from a maximum of about 700 in./lbs. when said door is fully closed to about 0 in./lbs.; and (ii), to more said door in an upslope direction through said angle $\theta$ from a maximum of about 400 in./lbs. when said door is fully open to about 0 in./lbs.

24. The combination as set forth in claim 14 wherein said counterbalancing rotational torque imparted to said torque tube during upslope movement of said door is non-linear and wherein the required manually generated rotational torque necessary to manually move said door along an upslope path progressively and smoothly decreases non-linearly as said door moves upslope from a fully closed or open position towards its highpoint.

25. The combination as set forth in claim 23 wherein said counterbalancing rotational torque imparted to said torque tube during upslope movement of said door is non-linear and wherein the required manually generated rotational torque necessary to manually move said door along an upslope path progressively and smoothly decreases non-linearly as said door moves upslope from a fully closed or open position towards its highpoint.

* * * * *